Jan. 21, 1969 D. L. HAMMOND 3,423,609
QUARTZ CRYSTAL TEMPERATURE TRANSDUCER
Filed Jan. 30, 1964
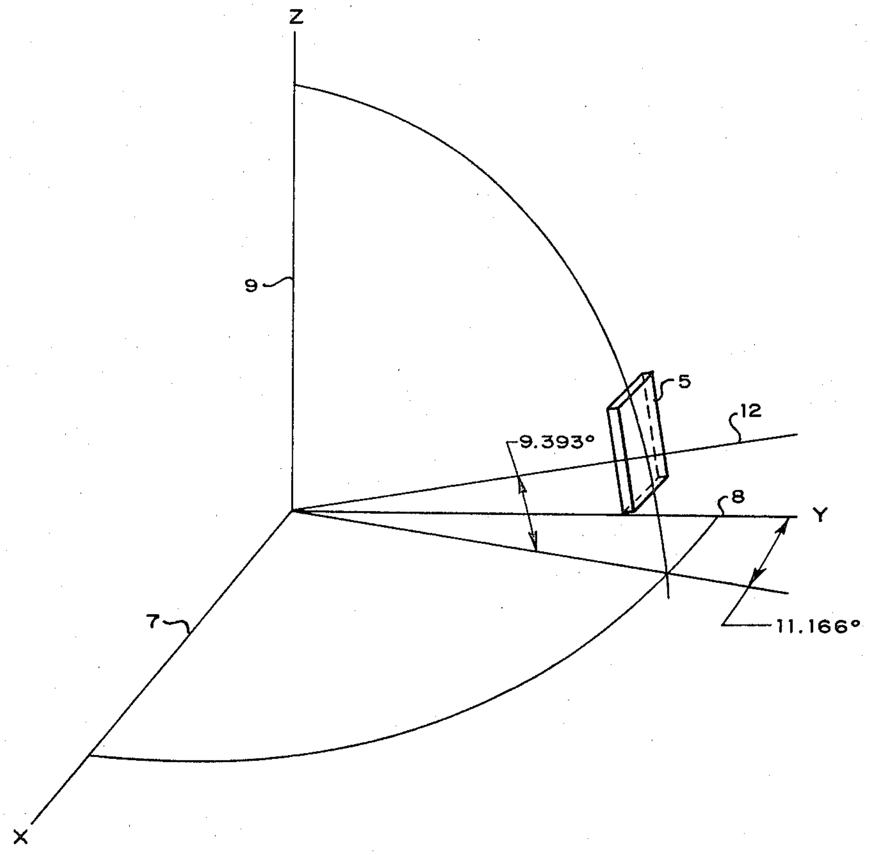
INVENTOR
DONALD L. HAMMOND
BY J. C. Chognard
ATTORNEY

United States Patent Office 3,423,609
Patented Jan. 21, 1969

3,423,609

QUARTZ CRYSTAL TEMPERATURE TRANSDUCER

Donald L. Hammond, Palo Alto, Calif., assignor to Hewlett-Packard Company, Palo Alto, Calif., a corporation of California Filed Jan. 30, 1964, Ser. No. 341,222
U.S. Cl. 310—9.5 4 Claims
Int. Cl. H02n *11/00*

This invention relates to a quartz crystal thermometer.

Quartz crystals change their resonance frequency with temperature. It has been proposed, therefore, to use them as thermometers: the quartz crystal is placed in the environment the temperature of which is to be measured, the resonance frequency of the crystal is measured and converted into a temperature reading. This conversion, however, presents a problem because the relationship between frequency and temperature is non-linear. For instance, the non-linearity of the quartz crystal thermometer described in the article entitled "Quartz Crystal Thermometer for Measuring Temperature Deviation in the $10^{-3}$ to $10^{-6}$° C. Range," published in the February 1962 Review of Scientific Instruments, is of the order of 2%.

Over several hundred degrees centigrade, the relationship of temperature to frequency of quartz crystal resonators can be quite accurately represented by a third order expansion as follows:

$$f(T)=f(0)[1+A(T-To)+B(T-To)^2+C(T-To)^3]$$

In accordance with the present invention, a quartz crystal resonator is cut in such a fashion that the second and third order temperature coefficients (B and C above) are each zero. A quartz crystal having a frequency which varies linearly with temperature is thus obtained.

It is the principal object of this invention to provide a quartz crystal the resonance frequency of which changes with temperature with a high degree of linearity.

The drawing shows a crystal in accordance with this invention.

Referring to the drawing, there is shown a crystal plate 5, together with its X-axis 7, its Y-axis 8 and its Z-axis 9. The orientation axis 12 of crystal plate 5 relative to the crystallographic axes of quartz can be broadly defined using the "Standards on Piezoelectric Crystals" published in the Proceedings of the IRE for December 1949, on pp. 1378 to 1395. Using this terminology, the plate orientation is:

$$(yxwl)\pm 11.166°+m120°/9.393°$$

where m=1, 2 or 3. Due to the symmetry of quartz, there are six such orientations having identical resonator properties, i.e. second and third order temperature coefficients equal to zero and a linear relationship with frequency. Thus the six orientations are:

$(yxwl)\,108.834°/9.393°$
$(yxwl)\,131.166°/9.393°$ } where $m=1$ $(yxwl)\,228.834°/9.393°$
$(yxwl)\,251.166°/9.393°$ } where $m=2$ $(yxwl)\,348.834°/9.393°$
$(yxwl)\,371.166°/9.393°$ } where $m=3$ The orientations where $m=3$ may be expressed as follows (by subtracting 360°):

$(yxwl)-11.166°/9.393°$
$(yxwl)=11.166°/9.393°$.

In the specific embodiment shown in the drawing, the orientation of crystal plate 5 is specifically:

$$(yxwl)\,11.166°/9.393°$$

The crystal cut in accordance with the above definition has a frequency vs. temperature non-linearity which is less than .05%. As one departs from the two defined angles, the non-linearity increases. When the departure is one degree, the non-linearity is of the order of .5%. Thus, in the following claims, the expression "approximately" is intended to cover a range of plus or minus one degree in each of the defined angles.

I claim:

1. A quartz crystal plate having an orientation of approximately $(yxwl)\pm 11.166°+m120°/9.393°$ where *m* is an integer not greater than 3.

2. A quartz crystal plate having an orientation of approximately $(yxwl)-11.166°/9.393°$.

3. A quartz crystal plate having an orientation of $(yxwl)\pm 11.166°+m120°/9.393°$ where *m* is an integer not greater than 3.

4. A quartz crystal plate having an orientation of $(yxwl)-11.166°/9.393°$.

References Cited

UNITED STATES PATENTS

| | | | |
|---|---|---|---|
| 2,661,433 | 12/1953 | Jaffe | 310—9 |
| 2,669,666 | 2/1954 | Mason | 310—9 |
| 2,554,332 | 5/1951 | Jaffe | 310—9 |

FOREIGN PATENTS

| | | |
|---|---|---|
| 874,798 | 8/1961 | Great Britain. |

OTHER REFERENCES

Electronic Design, May 10, 1966, article entitled "A Guide to Crystal Selection" by Otto Witz, pp. 48 to 51.

J D MILLER, *Primary Examiner.*

U.S. Cl. X.R.

310—8.9